US011215775B2

(12) United States Patent
Maker et al.

(10) Patent No.: US 11,215,775 B2
(45) Date of Patent: Jan. 4, 2022

(54) CONNECTION FEATURES FOR ELECTRONIC AND OPTICAL PACKAGING

(71) Applicant: Cisco Technology, Inc., San Jose, CA (US)

(72) Inventors: Ashley J. Maker, Pleasanton, CA (US); Joyce J. M. Peternel, Morgan Hill, CA (US); Sandeep Razdan, Burlingame, CA (US); Matthew J. Traverso, Santa Clara, CA (US); Aparna R. Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/544,699

(22) Filed: Aug. 19, 2019

(65) Prior Publication Data

US 2021/0055489 A1 Feb. 25, 2021

(51) Int. Cl.
*G02B 6/42* (2006.01)
(52) U.S. Cl.
CPC ........... *G02B 6/4292* (2013.01); *G02B 6/423* (2013.01); *G02B 6/4236* (2013.01); *G02B 6/4212* (2013.01)
(58) Field of Classification Search
CPC .... G02B 6/4292; G02B 6/423; G02B 6/4236; G02B 6/4212

USPC .......................................................... 385/88
See application file for complete search history.

(56) References Cited

U.S. PATENT DOCUMENTS

| 7,349,223 | B2 | 3/2008 | Haemer et al. | |
| 8,421,212 | B2 | 4/2013 | Chen et al. | |
| 9,123,685 | B2 | 9/2015 | Yap et al. | |
| 10,163,750 | B2 | 12/2018 | Yu et al. | |
| 2012/0121218 | A1* | 5/2012 | Kim | G02B 6/3885 385/14 |
| 2014/0153876 | A1* | 6/2014 | Dendas | G02B 6/3644 385/76 |
| 2016/0070048 | A1* | 3/2016 | Dietrich | G02B 6/4292 362/581 |
| 2017/0097482 | A1* | 4/2017 | Furuya | G02B 6/4239 |
| 2017/0271229 | A1 | 9/2017 | Santos et al. | |
| 2017/0343738 | A1* | 11/2017 | Kobyakov | G02B 6/30 |
| 2017/0343747 | A1* | 11/2017 | Giziewicz | G02B 6/3883 |
| 2018/0180826 | A1* | 6/2018 | Merget | G02B 6/136 |
| 2019/0384007 | A1* | 12/2019 | Matiss | G02B 6/4292 |

* cited by examiner

*Primary Examiner* — Jerry M Blevins
(74) *Attorney, Agent, or Firm* — Patterson + Shendan, LLP

(57) ABSTRACT

An optical connection assembly joining optical components is described. The optical connection assembly is manufactured using a fan out wafer level packaging to produce dies/frames which include mechanical connection features. A fastener is joined to a connection component and affixed to the mechanical connection features, to provide structural support to the connection between the connected component and the die/frame structure.

18 Claims, 13 Drawing Sheets

CONNECTION FEATURES FOR ELECTRONIC AND OPTICAL PACKAGING

TECHNICAL FIELD

Embodiments presented in this disclosure generally relate to streamlining the addition of mechanical features to secure electronic and optical packages.

BACKGROUND

Electronics and optical components are often joined together to provide connectivity between various other electronic and optical components creating electronic and optical packages. These packages frequently include additional parts to ensure proper functioning of the joined parts in the packages. For example, the electronic and optical packages may include the addition of heat sinks, mechanical supports, clamps, housings, and other structures around the chips and boards in the packages. These additional parts are useful to provide mechanical stability, pass necessary reliability testing, and enable adequate cooling and heat transfer.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
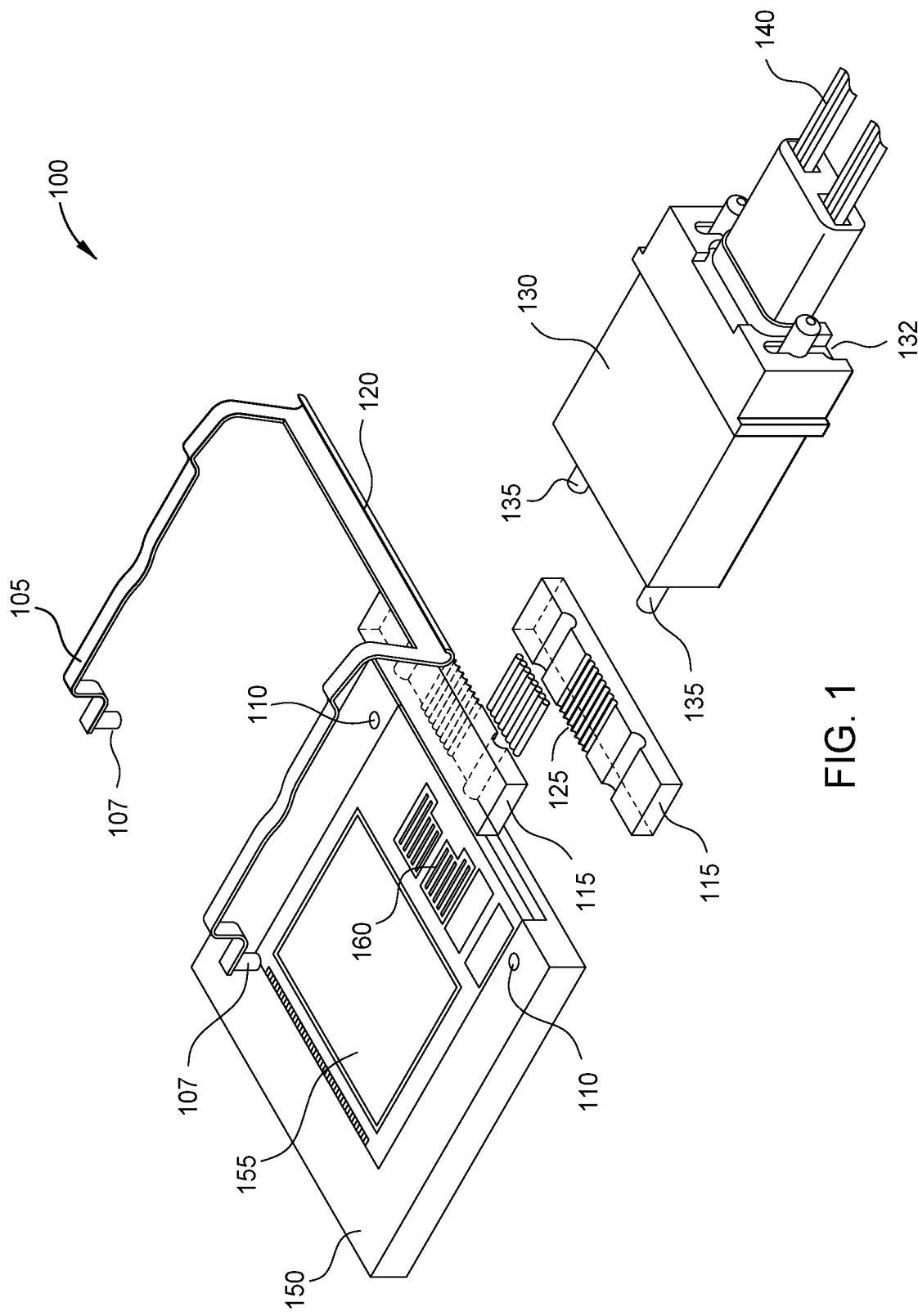
FIG. 1 illustrates an expanded view of an example optical connection assembly, according to embodiments described herein.

An example embodiment includes an optical connection assembly, including: a framing component including a mechanical connection feature; a photonic element including an optical feature, where the photonic element is affixed to the framing component. The optical connection assembly also includes an optical connector optically connected to the optical feature in the photonic element, where the optical connector includes an external contact point; and a fastener affixed to the framing component via the mechanical connection feature, where the fastener is joined to the external contact point to establish a mechanical connection between the optical connector and the photonic element.

An example embodiment includes a photonic connection assembly, including: a photonic element including an optical feature and a connection feature; an optical connector optically connected to the optical feature in the photonic element, where the optical connector includes an external contact point; and a fastener affixed to the photonic element via the connection feature, where the fastener is joined to the external contact point to secure the optical connector to the photonic element.

One general aspect includes a method for manufacturing an optical connection assembly. The method includes: affixing a photonic element and a mechanical connection feature to a carrier layer; forming a framing layer by covering the photonic element and the mechanical connection feature with a framing mold; removing a portion of the framing mold, where the removal of the portion exposes a bottom side of the photonic element and a bottom side of the mechanical connection feature; removing the carrier layer to form a die including the photonic element, the mechanical connection feature, and the framing layer; attaching an optical connector to the die to form an optical connection; joining a fastener to the optical connector; and affixing the fastener to the die via the mechanical connection feature.

Example Embodiments

As described above, electronic and optical packages are frequently created to provide connections between various electronic and optical components. In many cases, the electronic and optical packages include additional structures such as heat sinks, mechanical supports, clamps, housings, and other structures around the chips and boards in the packages. These parts provide mechanical stability such as securing the components of the packages to each other.

Adding the mechanical features such as holes and slots directly onto photonics dies and/or electronics boards using etching, drilling, or mechanical pick and place with epoxy bonding is expensive and time consuming. Additionally, the fragile components of the packages may be easily damaged during the addition of mechanical features when using mechanical etching and drilling processes. The time and monetary costs, as well as the increased likelihood of damages, increases the total investment for each package beyond an acceptable level.

For example, etching and drilling into dies and boards can be challenging due to mechanical tolerancing limitations (e.g., limited control of hole position, depth, and size) and also due to the risk of causing cracks or damage on the components. Additionally, some processes such as deep reactive ion etching (DRIE) are limited to producing holes/ mechanical features of up to a few hundred microns deep.

Furthermore, adding supporting mechanical components or features with pick and place with epoxy bonding requires accurate tools which are costly, challenging to use, and time-consuming, resulting in large capital and time expenses for each electronic or optical package.

The assemblies and methods described herein use Fan Out Wafer Level Packaging (FOWLP) processes to streamline the addition of mechanical components (e.g., a fastener, etc.) onto optical and electronics packages. The use of FOWLP processes provide a method to add mechanical connection and other features directly to a reconstituted die without the introduction of mechanical processes to fragile optical components. The resulting assemblies provide mechanical/structural support to the optical packages to ensure an optical connection between the components is maintained.

FIG. 1 illustrates an expanded view of an example optical connection assembly, according to embodiments described herein. The optical connection assembly, assembly 100, includes the framing component, mold compound 150 and a photonic element 155. In some examples, the mold compound 150 is a FOWLP frame or reconstituted die formed from an epoxy material which is cured to form reconstituted dies, where the mold compound 150 provides a frame/support for the photonic element 155. The mold compound 150 is formed in processes described in relation to FIGS. 6A-6G.

In some examples, the photonic element 155 includes a Photonic Integrated Circuit (PIC) including optical features 160 and/or an Electrical Integrated Circuit (EIC) as part of the mold compound 150. In some examples, the photonic element 155 is an optical device that may operate to amplify, dim, extinguish, phase shift, switch, modulate, direct optical signals, and convert optical signals to an electrical signal for use by an EIC integrated with or connected to the photonic element 155. The EIC is an electrical circuit that operates with the optical connection assembly described herein to send or receive and process optical signals. The EIC may include a processor, memory storage devices, communications interfaces to other electrical circuits or equipment, and components to drive or receive optical signals via an optical connection assembly including the photonic element 155. The photonic element 155 optically interfaces with the optical adapter 115 and/or the optical connector 130 to carry optical signals from the photonic element 155 to external devices or to the photonic element 155 from external devices via fibers 140. In some examples, the interfaces between the photonic element 155, the optical adapter 115, and/or the optical connector 130 includes an index matching epoxy applied to improve the optical coupling between the various elements.

In some examples, the photonic element 155 is aligned and affixed to the mold compound 150 using one or more reference points on the photonic element, such as fiducials and one or more reference points on the mold compound 150, etc. Additionally, the optical features 160 include one or more waveguides in the substrate of the photonic element 155, where the one or more waveguides are connected to an electrical and/or optical component integrated within the photonic element 155.

The assembly 100 also includes mechanical features 110 which provide a connection point for a fastener. In some examples, the mechanical features 110 include prefabricated and/or drilled holes/slots in the mold compound 150, where the holes/slots are added in the FOWLP process described in relation to FIGS. 6A-6G below. The mechanical features 110 provide a mechanical connection point for a fastener 105 (e.g., a clamp piece) including the mechanical attachment portion(s) and/or insertion sections, peg(s) 107. In some examples, the fastener 105 is attached to the mold compound 150 by the pegs 107 being inserted into the mechanical features 110. In some examples, the pegs 107 are further held in place in the mechanical features 110 by an additional joining material such as an adhesive, an epoxy, solder, etc. applied to the pegs 107 and the mechanical features(s) 110. Additional fasteners and mechanical connection features are described in relation to FIGS. 4A-5B.

The assembly 100 also includes the optical connector 130 which includes components to provide an optical connection between fibers 140 and the optical features 160. The optical connector 130 includes alignment components 135 (e.g., pins) which assist in the mechanical alignment of the optical connector 130 to the mold compound 150 and the photonic element 155. The optical connector 130 may also include one or more external contact points 132. In some examples, the external contact points 132 include standard features of the optical connector 130 and/or customized features added to the optical connector 130 to provide a contact point for the fastener 105. In some examples, the optical connector 130 is a standard Multi-fiber Push On (MPO) connector.

The fastener 105 may be formed from any material that can provide structural support and keep the components joined including molded plastic, molded metal, and/or wire. The fastener 105 leverages the mechanical connection features in the mold compound 150 (holes, slots, etc.) and on the contact points on a standard optical connector to help hold the connector in place using retention force. In some examples, the fastener 105 may include features to generate spring forces for retention (e.g., spring sections etc.). The fastener 105 may also be unjoined/removed from the external contact points 132 when a force is applied to the fastener, thus allowing the optical assembly to be taken apart and/or updated.

In some examples, the assembly 100 also includes an optical adapter 115 which may be positioned in order to aid the optical connection between the optical connector 130 and the photonic element 155. The optical adapter 115 may include a silicon dioxide ($SiO_2$) type glass (e.g., borofloat, borosilicate, etc.), where the silicon-oxygen bonds in the $SiO_2$ type glass. In some examples, the optical adapter 115 provides additional support and/or structure for the connection between the optical connector 130 and the photonic element 155. In some examples, the optical adapter 115 includes the adapter optical features, waveguides 125, to provide an optical connection between the optical connector 130 and the optical features 160 of the photonic element 155. While assembly 100 described in relation to FIG. 1 includes a single mold compound 150, fastener 105, and photonic element 155 the assembly 100 may include multiple dies, fasteners, and photonic/electronic elements connected to multiple optical and electrical connectors.

Figure 2A:
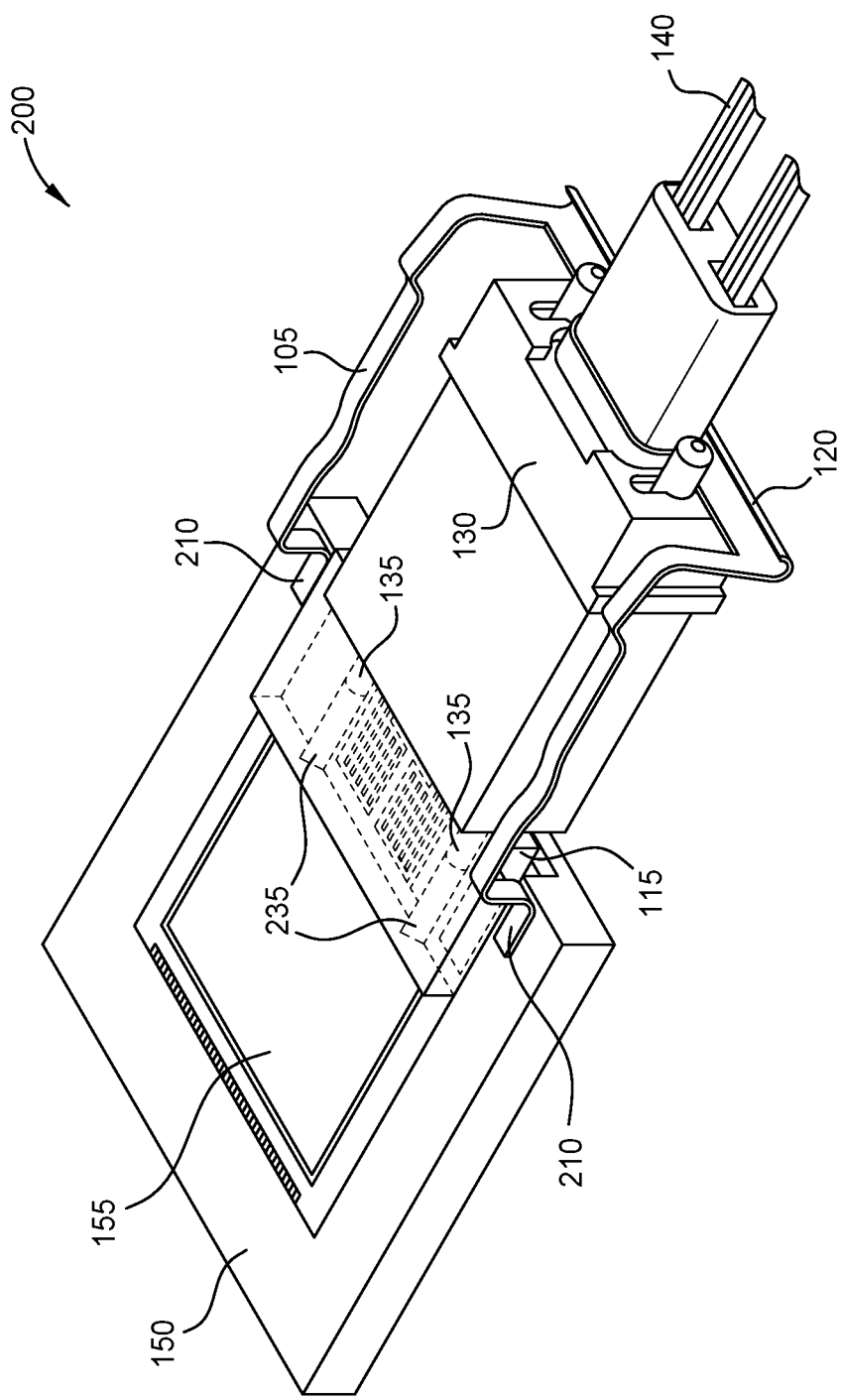
FIG. 2A illustrates an optical connection assembly with an optical adapter, according to embodiments described herein.

FIG. 2A illustrates an optical connection assembly, according to embodiments described herein. The optical connection assembly 200 includes the components of assembly 100 discussed in relation to assembly 100 in FIG. 1 arranged as a connected optical connection assembly 200. For example, the fastener 105 is affixed to the mold compound 150 at the connections 210. In one embodiment, the fastener 105 is affixed to the mold compound 150 by inserting the pegs 107 in the mechanical features 110 along with an adhesive where the adhesive and the peg 107 provide the connection 210. The optical connection assembly 200 includes the optical adapter 115 affixed/disposed on the topside of the photonic element 155/mold compound 150 to provide additional structural support to the connection between the photonic element 155 and the optical connector 130. In some examples, the optical adapter 115 is affixed to the photonic element using an index matching epoxy to provide optical coupling between the optical adapter 115 and the photonic element 155.

In some examples, the optical adapter 115 includes the alignment features 235 (e.g., pin holes that mate with the pins of the optical connector 130). In another example, the optical adapter and the photonic element 155 together form the alignment features 235. In some examples, the alignment features 235 include defined alignment paths/slats, pin holes, etc. that receive the alignment components 135 (pins) and aligns the optical connector 130 to the optical features 160 shown in FIG. 1. Once the optical connector 130 and the optical features 160 are aligned and connected, the fastener is positioned to the arrangement shown in FIG. 2A where an attachment portion 120 of the fastener 105 is joined to the optical connector 130 at the external contact points 132. This positioning of the fastener 105 secures the optical connector 130 to the photonic element 155 and the mold compound 150 to ensure the optical connection remains connected. The fastener 105 may also be unjoined/removed from the external contact points 132 when a force is applied to the fastener, thus allowing the optical assembly to be taken apart and/or updated. For example, a downward force on the fastener 105 shown in FIG. 2A unjoins the fastener 105 from the optical connector 130 and allows for the optical connector 130 to be easily removed from the assembly.

Figure 2B:
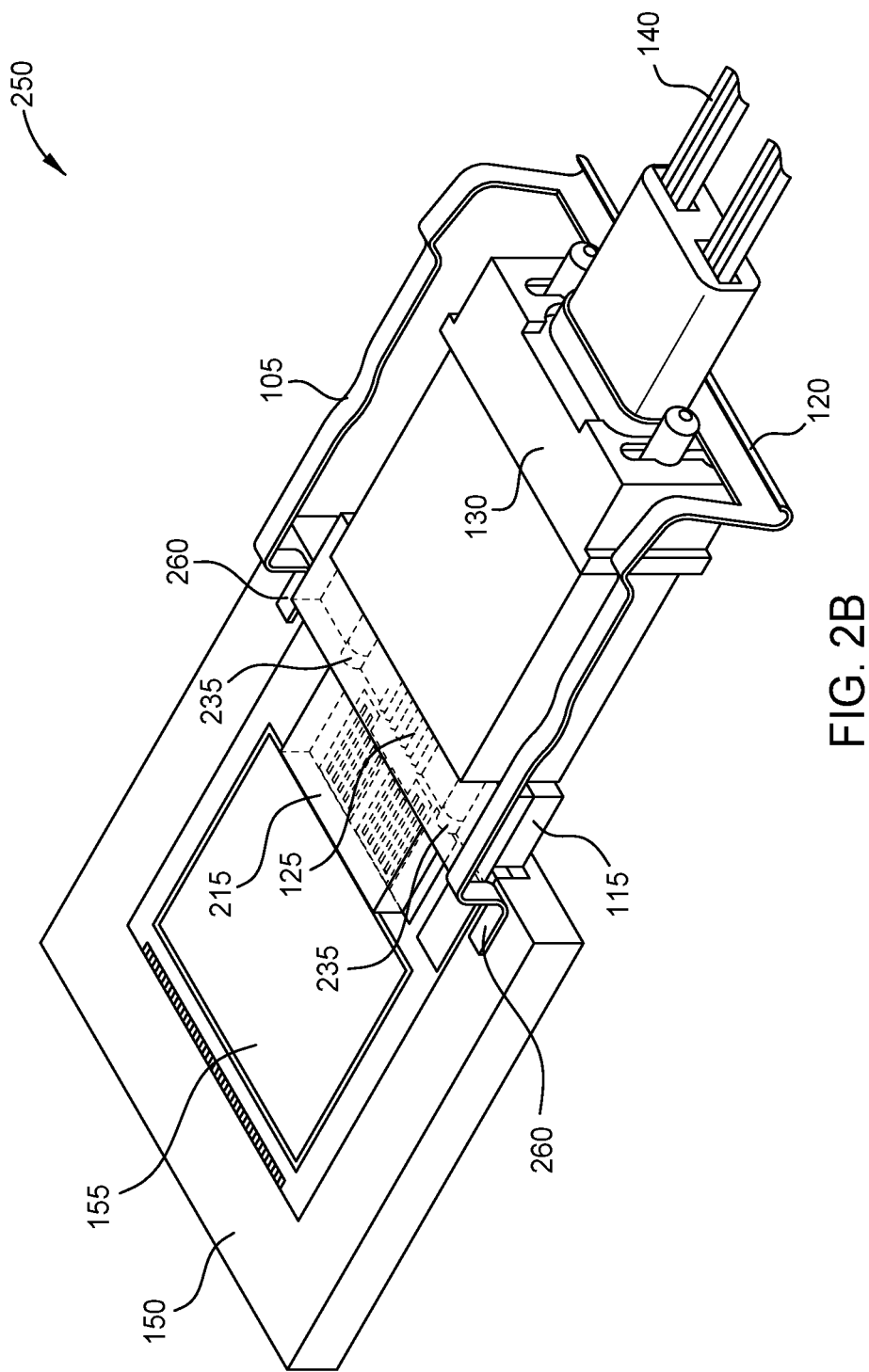
FIG. 2B illustrates an optical connection assembly with an optical adapter, according to embodiments described herein.

FIG. 2B illustrates an optical connection assembly, according to embodiments described herein. The optical connection assembly 250 includes the components of assembly 100 discussed in relation to assembly 100 in FIG. 1 arranged as a connected optical connection assembly 250. For example, the fastener 105 is affixed to the mold compound 150 at the connections 260. For example, the fastener 105 is affixed to the mold compound 150 by inserting the pegs 107 in the mechanical features 110 along with an adhesive where the adhesive and the peg 107 provide the connection 260. The optical connection assembly 250 includes the optical adapter 115 affixed and/or butt-coupled on a side of the photonic element 155/mold compound 150 to provide a connection between the photonic element 155 and the optical connector 130. In some examples, the optical adapter 115 is affixed to the photonic element using an index matching epoxy to provide optical coupling between the optical adapter 115 and the photonic element 155.

In some examples, the optical adapter 115 and the optical support 215 are affixed to the photonic element 155 and the mold compound 150, where the optical support 215 provides additional structural support to the optical adapter 115 when butt-coupled to a side of the photonic element 155.

In some examples, the optical adapter 115 shown in FIG. 2B includes the alignment features 235 which receive the alignment components 135 and aligns the optical connector 130 to the waveguides 125 shown in FIG. 1, where the waveguides 125 are optically connected to the optical features 160. When the optical connector 130 and the optical features 160 are aligned and connected, the fastener 105 is positioned to the arrangement shown in FIG. 2B where the fastener 105 is positioned around the optical connector 130, and where an attachment portion 120 of the fastener 105 is joined to the optical connector 130 at the external contact points 132. This positioning of the fastener 105 secures the optical connector 130 to the optical adapter 115 to ensure the optical connection remains connected. The fastener 105 may also be unjoined/removed from the external contact points 132 when a force is applied to the fastener, thus allowing the optical assembly to be taken apart and/or updated. For example, a downward force on the fastener 105 shown in FIG. 2B unjoins the fastener 105 from the optical connector 130 and allows for the optical connector 130 to be easily removed from the assembly.

Figure 3A:
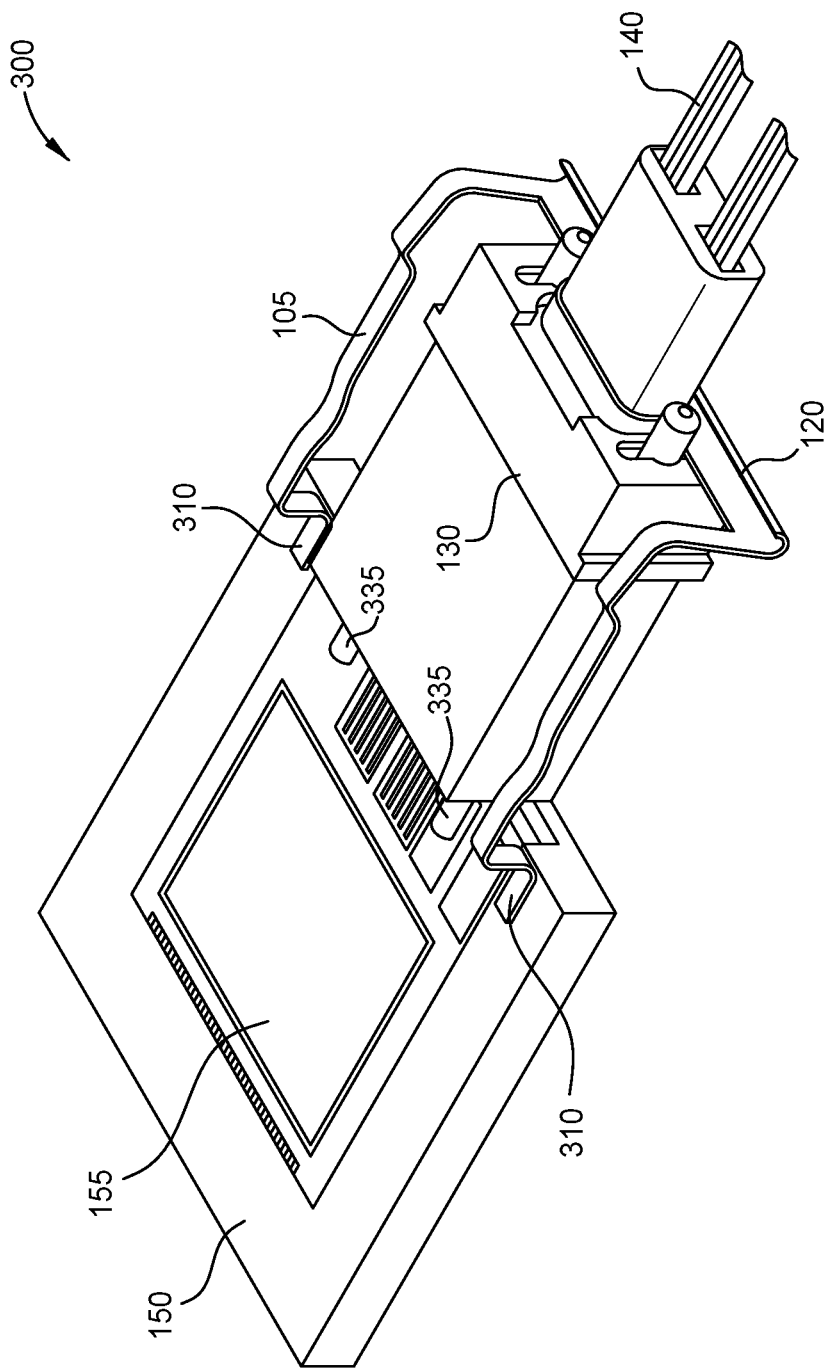
FIG. 3A illustrates an optical connection assembly without an optical adapter, according to embodiments described herein.

FIG. 3A illustrates an optical connection assembly, according to embodiments described herein. The optical connection assembly 300 includes the components of assembly 100 discussed in relation to assembly 100 in FIG. 1 arranged as a connected optical connection assembly 300 without an optical adapter thus providing a direct connection between the optical connector 103 and the optical features 160. In some examples, the fastener 105 is affixed to the mold compound 150 at the connections 310 in a manner similar to connections 210 as described in FIG. 2A. In some examples, the photonic element 155 includes the alignment features 335. In some examples, the alignment features 335 include defined alignment paths/slats etc. directly in the photonic element 155 that receive the alignment components 135 and aligns the optical connector 130 to the optical features 160 shown in FIG. 1. Once the optical connector 130 and the optical features 160 are aligned and connected, the fastener 105 is positioned to the arrangement shown in FIG. 3A where an attachment portion 120 of the fastener 105 is joined to the optical connector 130 at the external contact points 132. This positioning of the fastener 105 secures the optical connector 130 to the photonic element 155 and the mold compound 150 to ensure the optical connection remains connected. As described in FIGS. 2A and 2B, the fastener 105 may also be unjoined/removed from the external contact points 132 when a force is applied to the fastener, thus allowing the optical assembly to be taken apart and/or updated. For example, a downward force on the fastener 105 shown in FIG. 3A unjoins the fastener 105 from the optical connector 130 and allows for the optical connector 130 to be easily removed from the assembly.

Figure 3B:
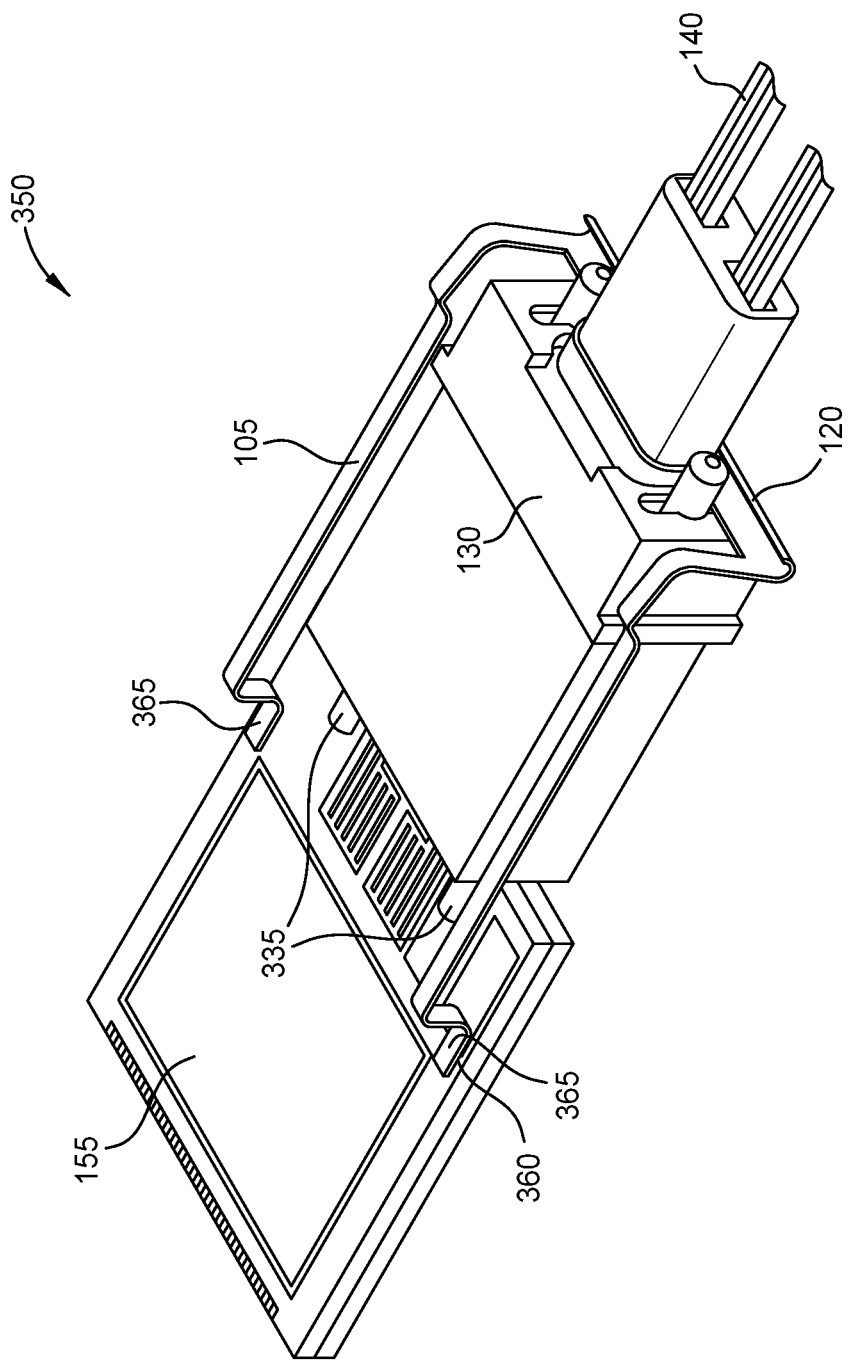
FIG. 3B illustrates a photonic connection assembly, according to embodiments described herein.

FIG. 3B illustrates a photonic connection assembly, according to embodiments described herein. In the examples described in relation to FIGS. 1-3A, the optical connection assemblies includes the mold compound 150. The photonic assembly 350 includes the fastener 105 directly attached to the photonic element 155 eliminating the need for the mold compound 150. For example, the fastener 105 is affixed to the photonic element 155 one or more connection features 360. The connection features 360 may include connection pads configured for the attachment portions 365. For example, the attachment portions 365 may be directly epoxied to the connection pads. In some examples, the connection features 360 include mechanically defined features such as hole or slats.

In some examples, the photonic element 155 includes the alignment features 335 including defined alignment paths/slats etc. directly in the photonic element 155 that receive the alignment components 135 and aligns the optical connector 130 to the optical features 160 shown in FIG. 1. Once the optical connector 130 and the optical features 160 are aligned and connected, the fastener is positioned to the arrangement shown in FIG. 3B where the fastener 105 is positioned around the optical connector 130, where an attachment portion 120 of the fastener 105 is joined to the optical connector 130 at the external contact points 132. This positioning of the fastener 105 secures the optical connector 130 to the photonic element 155 to ensure the optical connection remains connected. As described in FIGS. 2A-2B and 3A, the fastener 105 may also be unjoined/removed from the external contact points 132 when a force is applied to the fastener, thus allowing the optical assembly to be taken apart and/or updated. For example, a downward force on the fastener 105 shown in FIG. 3B unjoins the fastener 105 from the optical connector 130 and allows for the optical connector 130 to be easily removed from the assembly. While shown without an optical adapter in FIG.

3B, the photonic assembly 350 may also include an optical adapter and optical support as described in FIGS. 2A-2B.

Figure 4A:
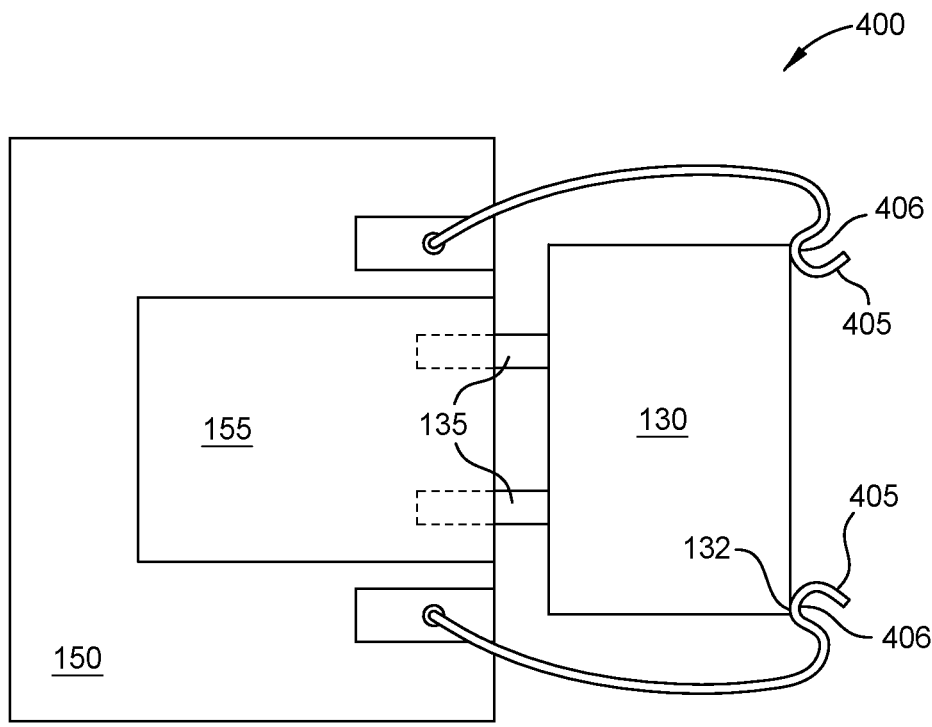
FIGS. 4A-B illustrate detailed views of fasteners for example optical assemblies, according to embodiments described herein.
Figure 4B:
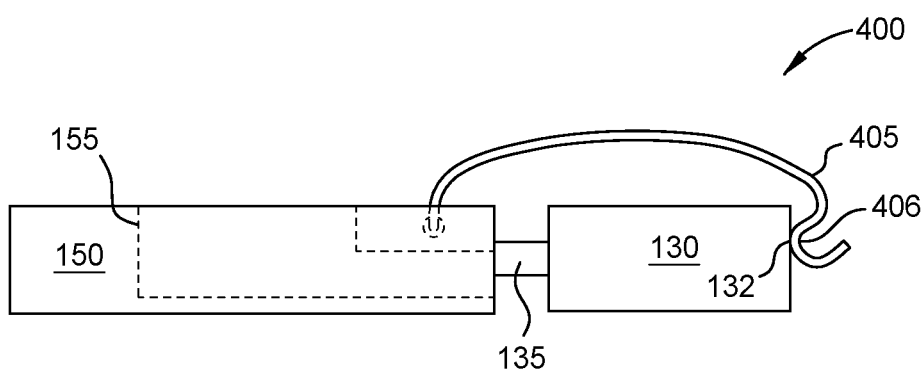

FIGS. 4A-B illustrate detailed views of fasteners for example optical assemblies, according to embodiments described herein. The optical assembly 400 may include any of the optical assemblies 200, 250, 300, and 350 described in relation to FIGS. 2A-3B with a fastener 405. FIG. 4A illustrates a top view of the optical assembly 400 and the fastener 405, where the fastener 405 includes two clamp pieces, each of the two clamp pieces include an attachment portion 406. In some examples, the attachment portions 406 are joined to the optical connector 130 at the one or more external contact points 132. In some examples, the fastener 405 includes springs configured to apply a retention/retaining force at the external contact points 132 to secure the optical connector 130 to the photonic element 155 and/or the mold compound 150. The spring also allow for the fastener 405 to be unjoined/removed from the external contact points 132 when a force is applied to the fastener, thus allowing the optical assembly to be easily taken apart and/or updated. As shown in FIG. 4A, the fastener 405 may be positioned around the sides of the optical connector 130 and to the external contact points 132. FIG. 4B illustrates a side view of the optical assembly 400 and the fastener 405. As shown in FIG. 4B, the fastener 405 may be positioned about the top of the optical connector 130 and to the external contact points 132.

Figure 5A:
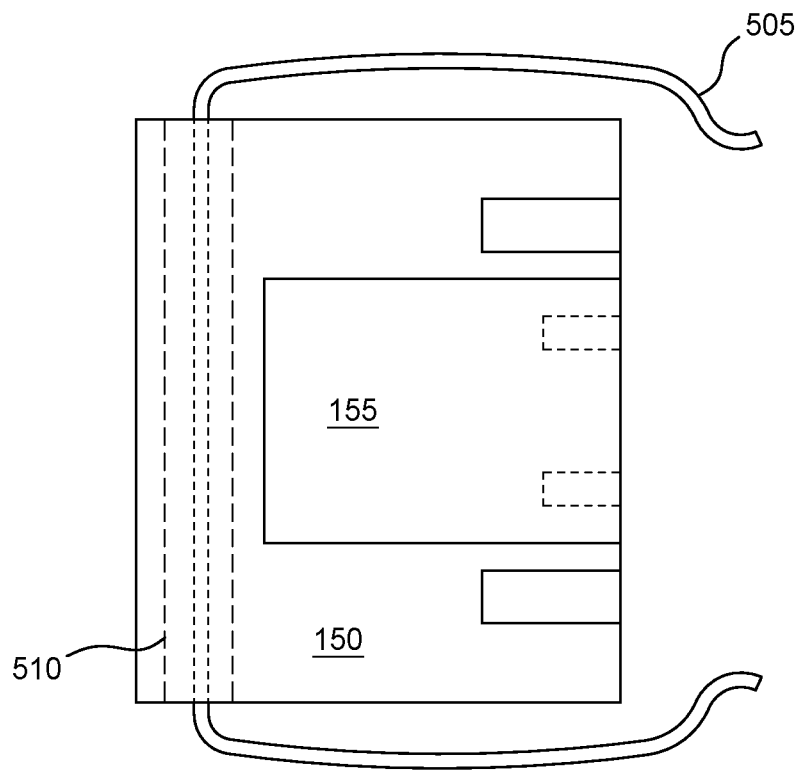
FIGS. 5A-B illustrate detailed views of a mechanical connection feature for example optical assemblies, according to embodiments described herein.
Figure 5B:
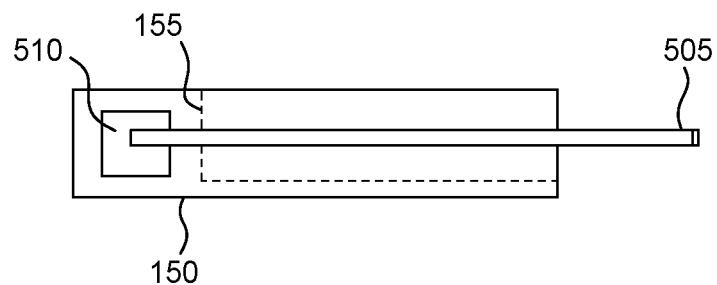

FIGS. 5A-B illustrate detailed views of a mechanical connection feature for example optical assemblies, according to embodiments described herein. For example, as shown in the top view of the mold compound 150 in FIG. 5A and the side view of the mold compound 150 in FIG. 5B, the mechanical connection feature 510 extends horizontally through the mold compound 150. In this example, the fastener 505 is affixed to the mold compound 150 by passing through the mechanical connection feature 510.

Figure 6A:
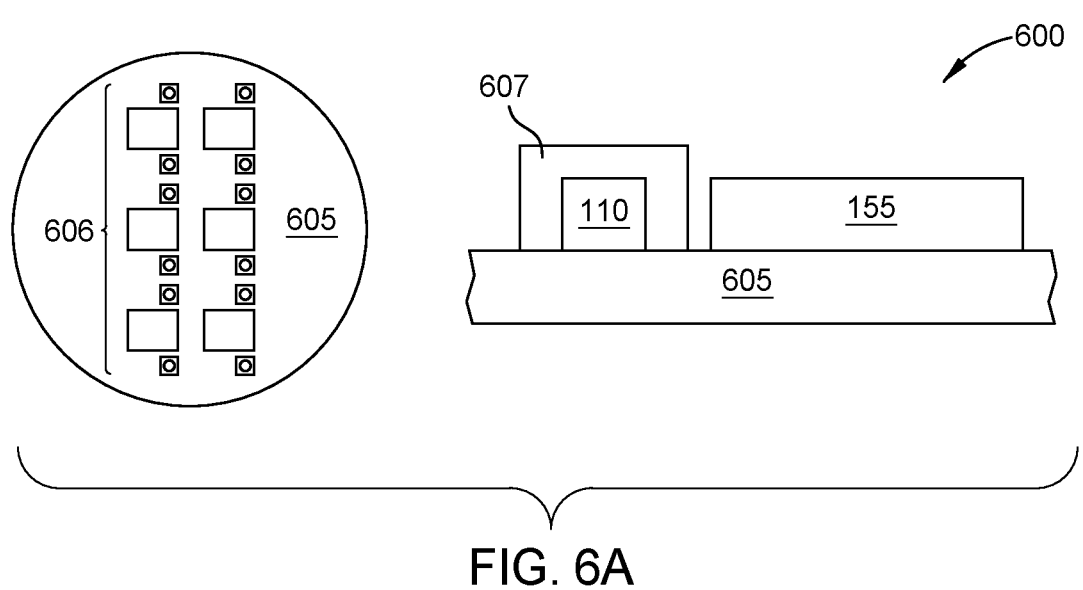
FIGS. 6A-G illustrate various views of the fabrication of an optical connection assembly, according to embodiments described herein.

FIGS. 6A-G illustrate various views of the fabrication of an optical connection assembly, according to embodiments described herein. FIG. 6A illustrates a top and side view of a first step 600 in the fabrication of an optical assembly. At step 600, a photonic element and one or more mechanical connection features are attached/affixed to a carrier layer. For example, as shown, a top side of the photonic element 155 and the mechanical feature 110 are attached to the carrier 605. In some examples, a plurality of photonic elements 155 and mechanical features 110 are attached to a wafer of the carrier 605 to create multiple arrangements 606 of the photonic elements and mechanical features. In some examples, attaching/affixing the photonic elements 155 and mechanical features 110 is done with a standard FOWLP process to place photonics dies and other components onto a sticky tape or carrier wafer. In some examples, the mechanical features 110 include preformed hole/slot structures that are affixed to the carrier 605. The mechanical features may include a portion 607 which covers the mechanical feature 110 to prevent a framing mold from entering the mechanical features 110.

Figure 6B:
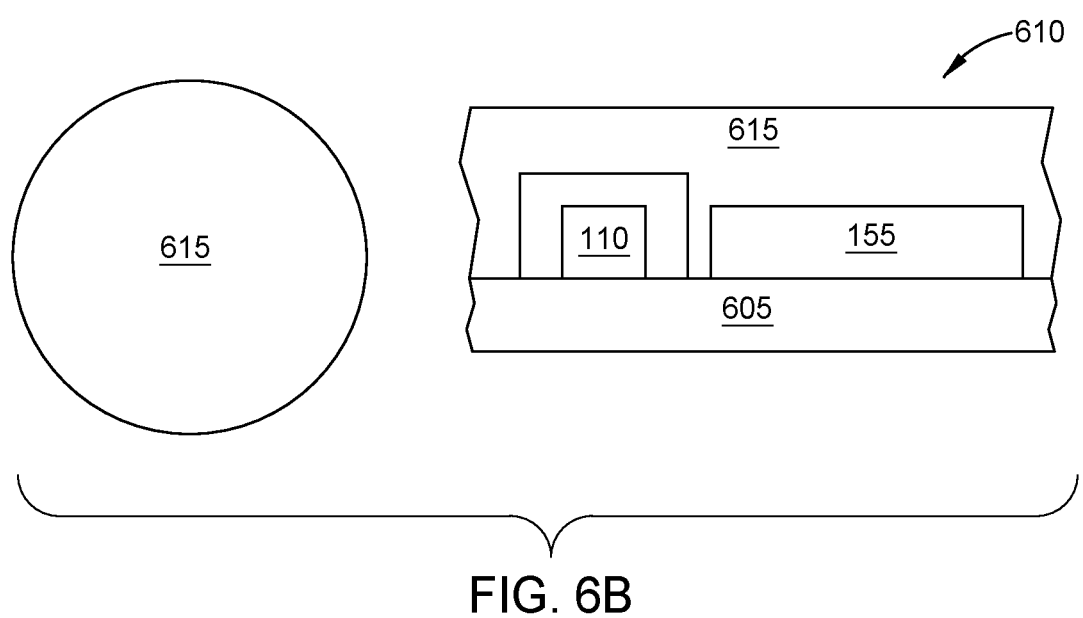

FIG. 6B illustrates a top and side view of a second step 610 in the fabrication of an optical assembly. At step 610, a framing layer 615 is formed by covering the photonic element 155 and the one or more mechanical connection features with a framing mold. In some examples, the framing mold fills the areas between the photonic element 155 and the mechanical features 110 to form the framing layer 615.

Figure 6C:
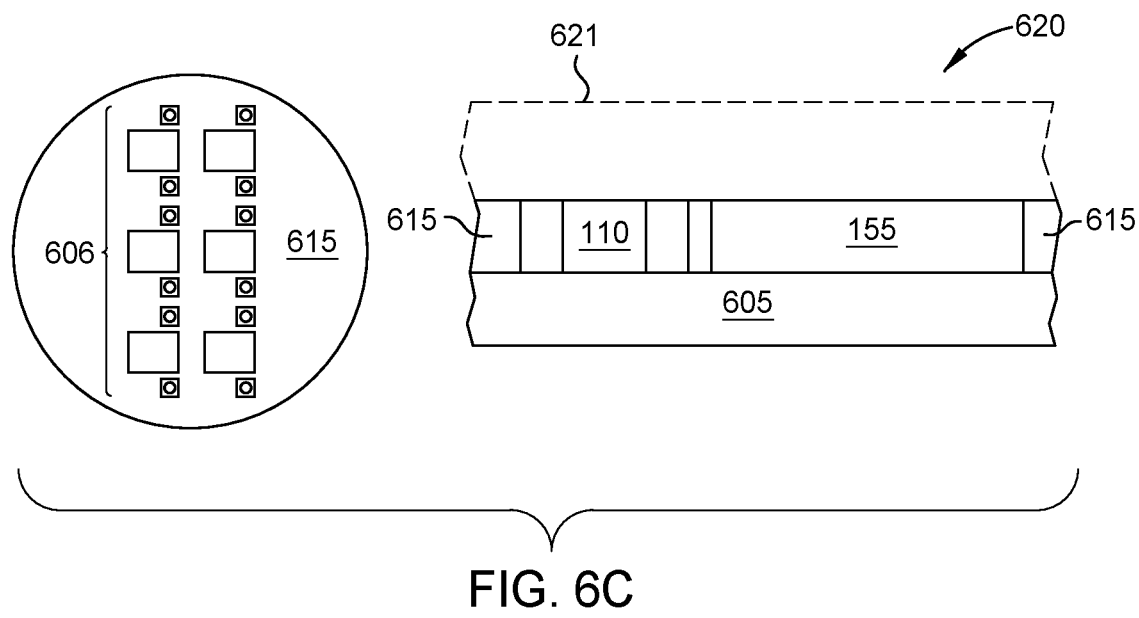

FIG. 6C illustrates a top and side view of a third step 620 in the fabrication of an optical assembly. At step 620, a portion 621 of the framing mold/layer 615 is removed. For example, when the framing layer mold compound has cured, the portion 621 is mechanically ground to remove the portion 621 of mold compound and expose the hole structures/bottom side of the mechanical features 110 (e.g., removing portion 607) and backside/bottom side of the photonic element 155.

Figure 6D:
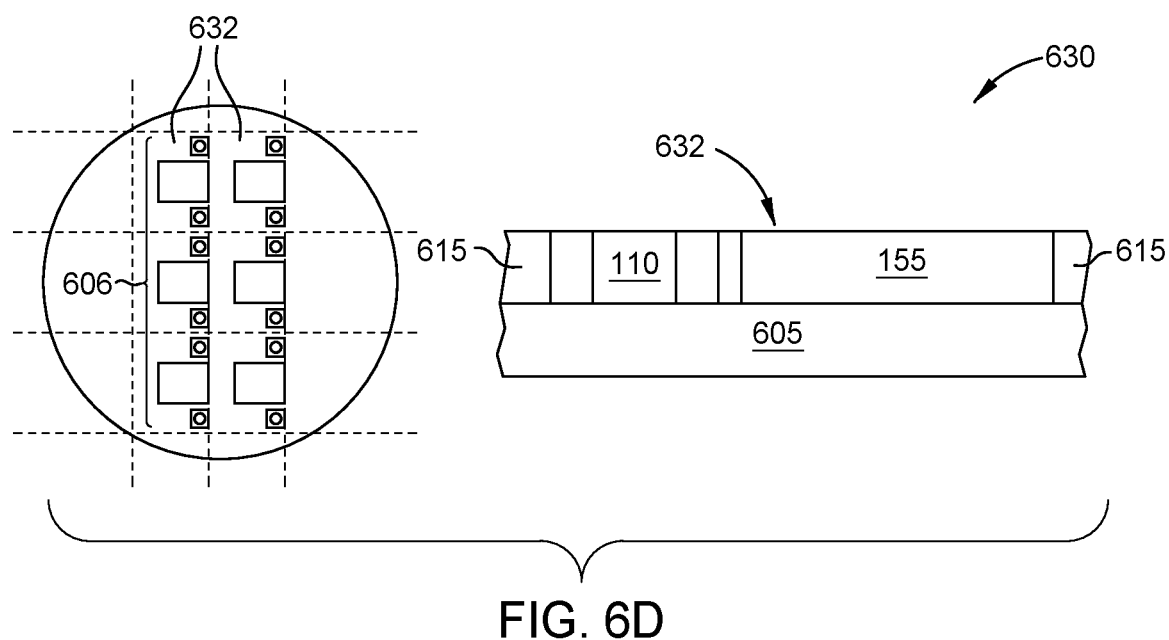

FIG. 6D illustrates a top and side view of a fourth step 630 in the fabrication of an optical assembly. At step 620, the carrier 605 is removed to form a die 632. In some examples, each die 632 includes the photonic element 155, the one or more mechanical connection features, mechanical features 110, and the remaining framing layer 615. In some examples, the carrier 605 is removed at the wafer-level and the plurality of arrangements 606 are diced into a plurality of dies 632. In some examples, additional processing to form vias, redistribution layers, and/or other electronics structures are completed prior to dicing the dies 632.

Figure 6E:
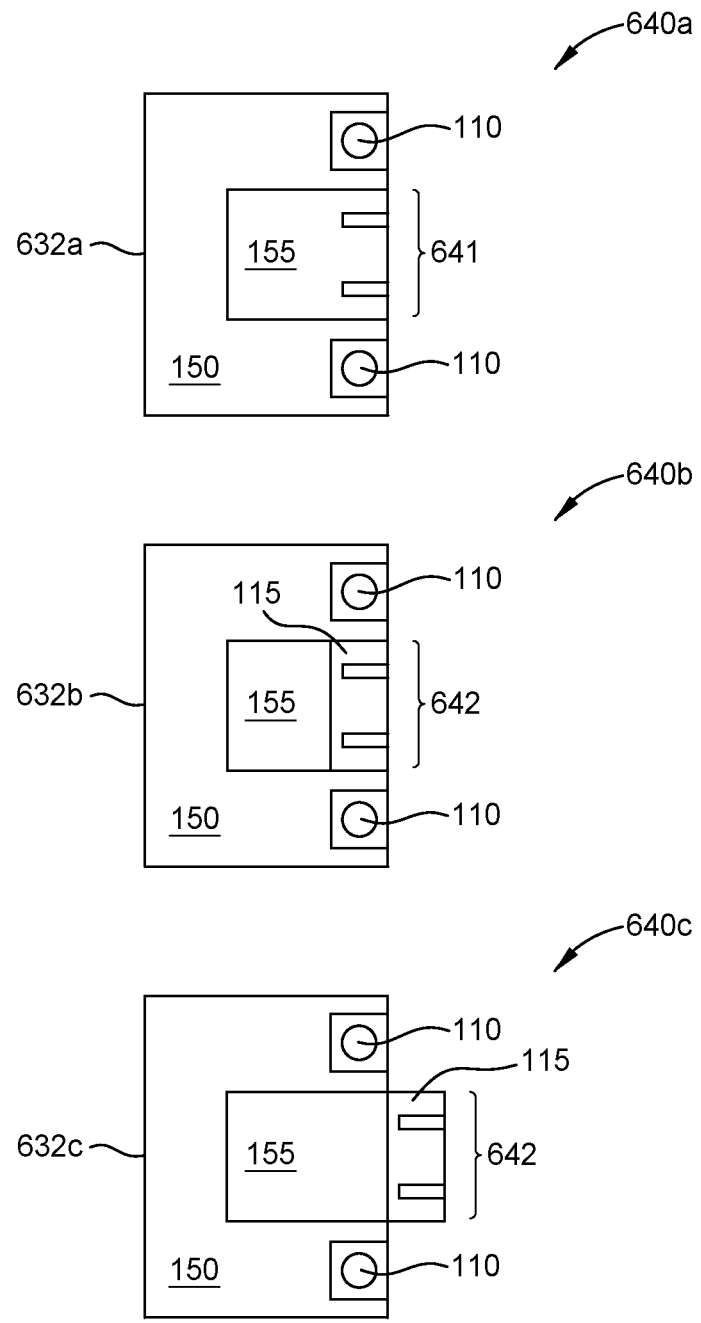

FIG. 6E illustrates top views of various fifth steps 640a, 640b, and 640c in the fabrication of an optical assembly. At steps 640a, 640b, and 640c the dies 632a-632c are further processed using standard fabrication processes to complete any additional opto-mechanical assembly needed (e.g., chip attach, laser attach, etc.). For example, alignment features 641 (e.g., pin holes) are defined in the photonic element 155 in die 632a at the step 640a. In an example, where the mold compound 150 is not present, such as described in relation to FIG. 3B, the contact pads and/or connection features 360 are added to the photonic element 155 using standard fabrication processes.

In some examples, the dies 632b and 632c are too thin to support alignment features directly in the photonic element 155. In these examples, an optical adapter 115 is affixed to the die at steps 640b and 640c. In some examples, the optical adapter includes alignment features 642 formed in the adapters prior to affixing the optical adapter 115 to the dies. At step 640b, the optical adapter 115 is disposed/affixed to on a top portion of the photonic element 155. For example, the optical adapter 115 is placed on the die 132b to form a socket in combination with existing pin holes on the die. In another example, at step 640c, optical adapter 115 is actively aligned/affixed to a side of the die 632c by a butt-coupling process using an index matching epoxy. In some examples, an optical support 215 as shown in FIG. 2B is also affixed to the die 632c to provide additional structural support to the optical adapter 115.

Figure 6F:
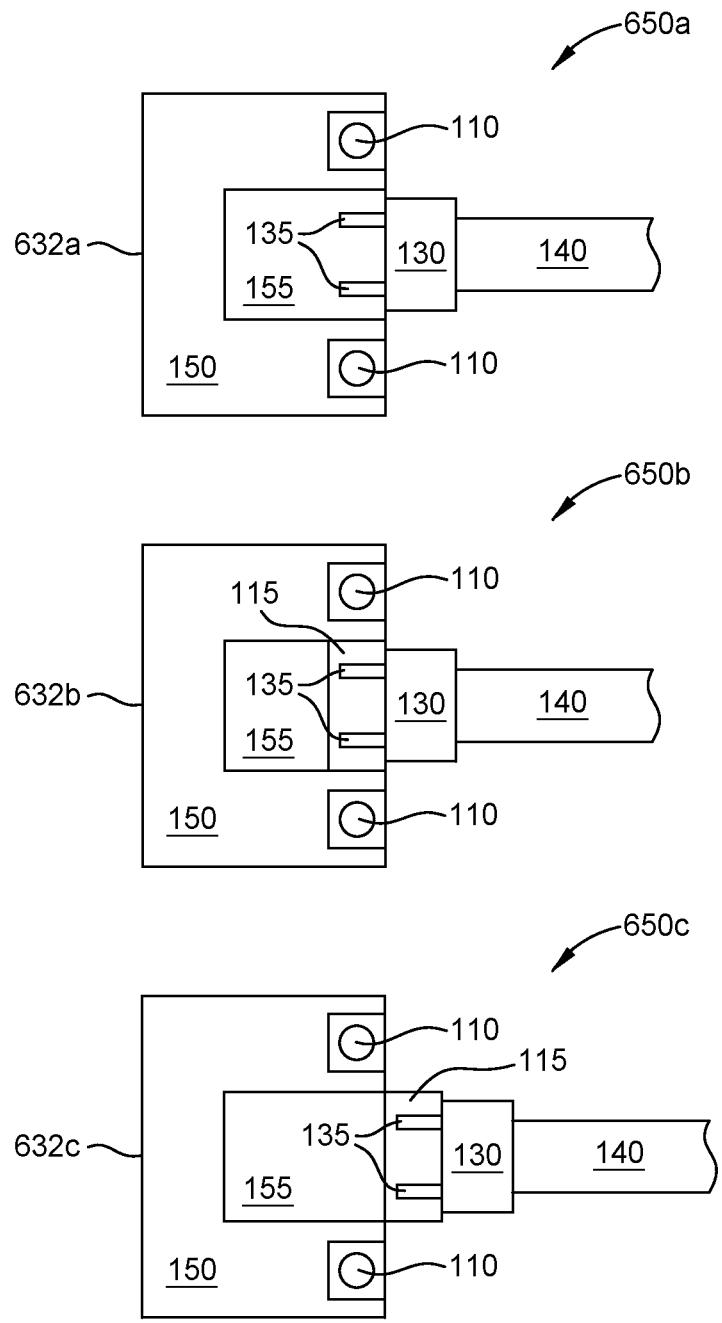

FIG. 6F illustrates top views of various sixth steps 650a, 650b, and 650c in the fabrication of an optical assembly. At steps 650a, 650b, and 650c an optical connector 130 is attached to the dies 632a-632c to form an optical connection. For example, at the step 650a, the optical connector 130 and the alignment components 135 are aligned with the photonic element 155 and connected to provide the optical connection between the optical features 160 and the fibers 140. At steps 650b and 650c the optical connector 130 and the alignment components 135 are connected to the photonic element using the optical adapter 115.

Figure 6G:
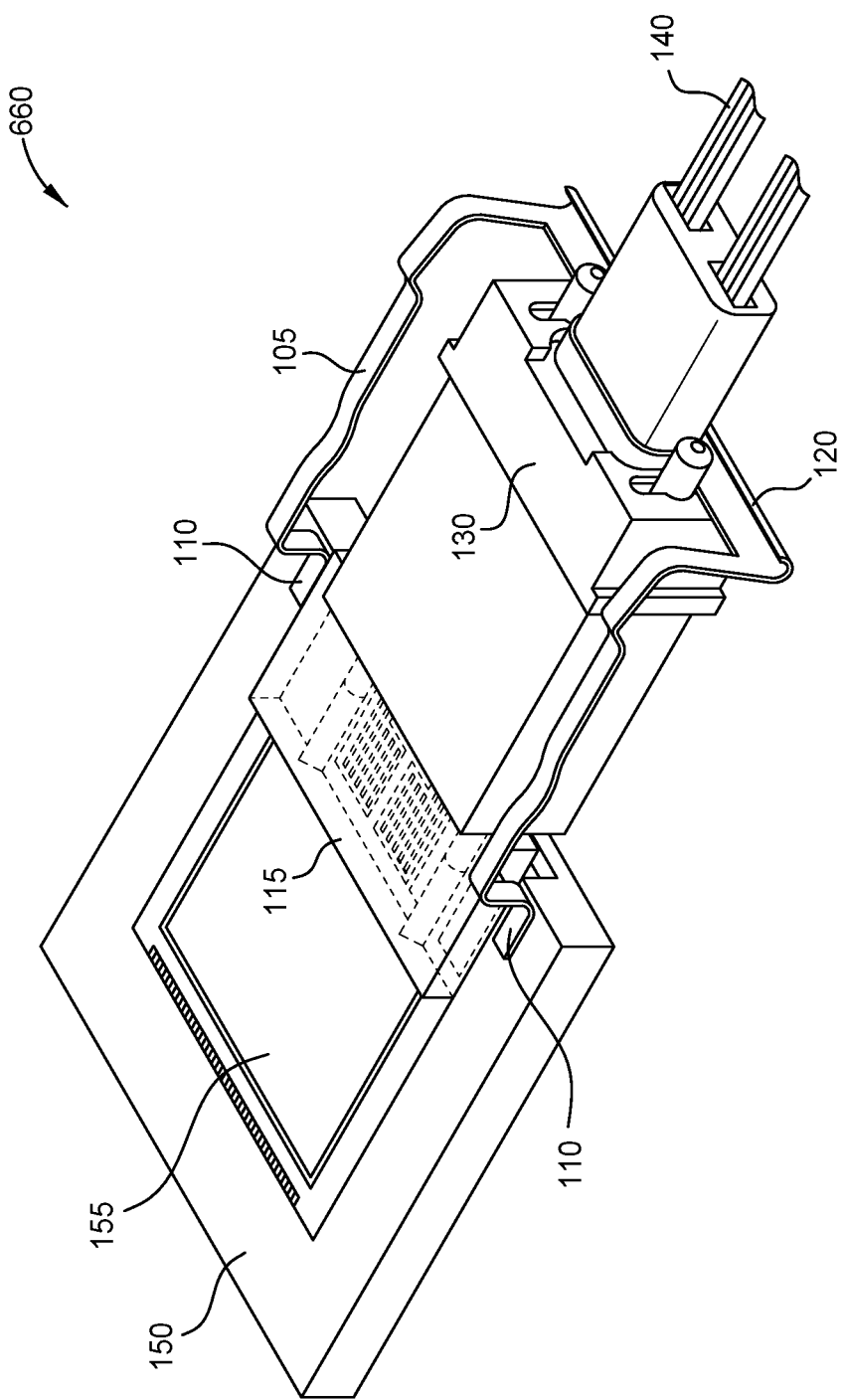

FIG. 6G illustrates a seventh step 660 in the fabrication of an optical assembly. At step 660, a fastener 105 about the optical connector 130 and affixed to the die via the one or more mechanical connection features, mechanical features 110. For example, the pegs 107 of the fastener 105 are inserted into the holes of the mechanical features 110 made during previous steps allowing the fastener surrounding the optical connector 130 to securely hold the fiber connector in place. In some examples, step 660 includes adding an epoxy, solder, and/or other joining material component to the mechanical features 110 and/or the fastener 105 to hold the fastener in place. While shown with an optical adapter in FIG. 6G, the fastener 105 is affixed to the dies 132a-132c in a similar manner to form the various connections 210, 260, 310, and 365 described in relation to FIGS. 2A-3B.

Figure 7:
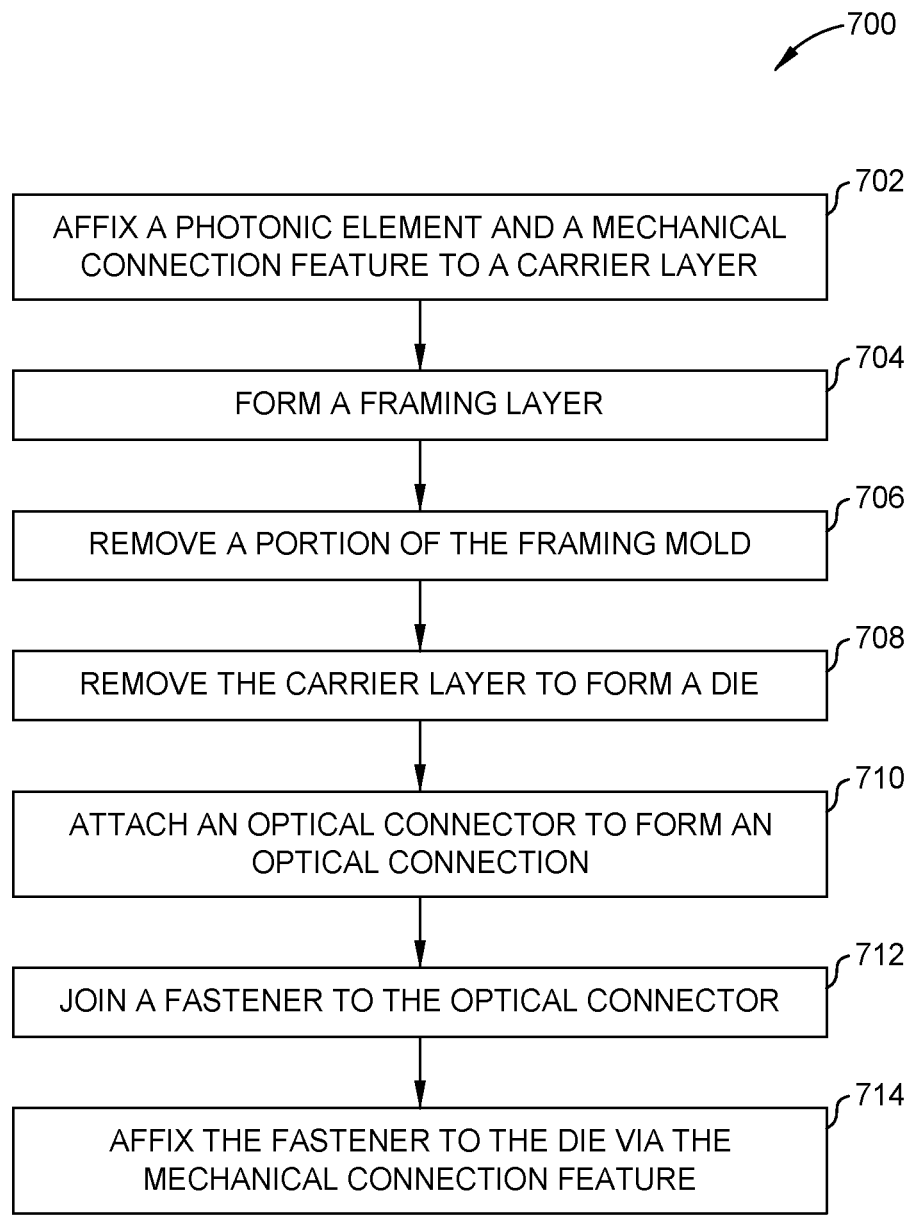
FIG. 7 is a flow chart outlining general operations in an example method to produce an optical connection assembly, according to embodiments described herein.

FIG. 7 is a flow chart outlining general operations in an example method to produce an optical connection assembly, according to embodiments described herein. Reference will be made to previous figures. Method 700 begins at block 702 where a photonic element and a mechanical connection feature are affixed to a carrier layer such as shown in step 600 of FIG. 6A. In some examples, the carrier includes a carrier layer wafer, where a plurality of photonic elements and mechanical connection features are affixed to the carrier layer as also shown in FIG. 6A.

At block 704, a framing layer is formed by covering the photonic element and the mechanical connection feature with a framing mold as shown in step 610 in FIG. 6B. At block 706, a portion of the framing mold is removed. For example, the portion 621 at step 620 in FIG. 6C is removed from the framing mold. In some examples, the removal of the portion 621 exposes a bottom side of the photonic element 155 and a bottom side of the mechanical connection feature 110.

At block 708, the carrier layer is removed to form a die where the die includes the photonic element, the mechanical connection feature, and the framing layer. In some examples, removing the carrier layer also includes removing the carrier layer from the plurality of photonic elements, mechanical connection features, and framing layer of the carrier layer wafer and dicing the framing layer into single dies as shown in step 630 of FIG. 6D.

At block 710, an optical connector is attached to the die to form an optical connection. In some examples, attaching the optical connector may also include affixing an optical adapter to the die, such as on disposing and affixing the optical adapter on the photonic element and/or butt-coupling the optical adapter to a side of the photonic element and the die as described in steps 640b and 640c of FIG. 6E.

At block 712, a fastener is joined to the optical connector and at block 714, the fastener is affixed to the die via the mechanical connection feature. For example, as shown in step 660 of FIG. 6G, the fastener 105 is joined to the optical connector 130 at the attachment portion 120 and the external contact points 132. The fastener 105 is also affixed to the mold compound 150 at the mechanical features 110. In some examples, the fastener 105 is affixed/epoxied to the mold compound 150 prior to connecting the optical connector 130.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An optical connection assembly, comprising:
   a framing component comprising a mechanical connection feature, wherein the mechanical connection feature comprises a first hole and a second hole;
   a photonic element comprising an optical feature, wherein the photonic element is affixed to the framing component;
   an optical connector optically connected to the optical feature in the photonic element, wherein the optical connector comprises an external contact point; and
   a fastener affixed to the framing component via the mechanical connection feature, wherein the fastener is joined to the external contact point to establish a mechanical connection between the optical connector and the photonic element, wherein the fastener comprises a first insertion section and a second insertion section, and wherein the first insertion section is inserted in the first hole and the second insertion section is inserted in the second hole, and wherein the optical connection assembly further comprises a joining material disposed on the first insertion section, the first hole, the second insertion section, and the second hole to secure the fastener to the framing component.

2. The optical connection assembly of claim 1, wherein the photonic element comprises at least one alignment feature, wherein the alignment feature provides an alignment between the photonic element and alignment features of the optical connector; and
   wherein the optical connector is directly optically connected to the optical feature in the photonic element.

3. The optical connection assembly of claim 1, further comprising:
   an optical adapter affixed to the photonic element and framing component, wherein the optical adapter comprises:
      at least one alignment feature wherein the alignment feature provides an alignment between the optical adapter and alignment features of the optical connector.

4. The optical connection assembly of claim 3, wherein the optical adapter is disposed on the photonic element, and wherein the optical connector is directly optically connected to the optical feature in the photonic element.

5. The optical connection assembly of claim 3, wherein the optical adapter is disposed between the photonic element and the optical connector,
   wherein the optical adapter further comprises adapter optical features, and
   wherein the optical connector is optically connected to the optical feature in the photonic element via the adapter optical features.

6. The optical connection assembly of claim 1, wherein the fastener comprises a clamp piece, wherein the clamp piece comprises an attachment portion, wherein the attachment portion is joined to the optical connector at the external contact point.

7. The optical connection assembly of claim 1, wherein the fastener comprises two clamp pieces, wherein each of the two clamp pieces comprise an attachment portion, wherein the attachment portion of each of the two clamp pieces is joined to the optical connector at the external contact point.

8. The optical connection assembly of claim 1, wherein the fastener comprises spring sections, wherein the spring sections provide a retaining force to secure the optical connector to the framing component.

9. A photonic connection assembly, comprising:
a photonic element comprising an optical feature and a connection feature, wherein the connection feature comprises a first hole and a second hole;
an optical connector optically connected to the optical feature in the photonic element, wherein the optical connector comprises an external contact point; and
a fastener affixed to the photonic element via the connection feature, wherein the fastener is joined to the external contact point to secure the optical connector to the photonic element, wherein the fastener comprises a first insertion section and a second insertion section, and wherein the first insertion section is inserted in the first hole and the second insertion section is inserted in the second hole, and wherein the photonic connection assembly further comprises a joining material disposed on the first insertion section, the first hole, the second insertion section, and the second hole to secure the fastener to the photonic element.

10. The photonic connection assembly of claim 9, wherein the connection feature comprises a first connection pad and a second connection pad, wherein the fastener comprises a first section affixed to the first connection pad with a joining material and a second section affixed to the first connection pad with a joining material.

11. The photonic connection assembly of claim 9, wherein the fastener comprises a clamp piece, wherein the clamp piece comprises an attachment portion, wherein the attachment portion is joined to the optical connector at the external contact point.

12. An optical connection assembly, comprising:
a framing component comprising a mechanical connection feature;
a photonic element comprising an optical feature, wherein the photonic element is affixed to the framing component;
an optical connector optically connected to the optical feature in the photonic element, wherein the optical connector comprises an external contact point;
a fastener affixed to the framing component via the mechanical connection feature, wherein the fastener is joined to the external contact point to establish a mechanical connection between the optical connector and the photonic element; and
an optical adapter disposed between the photonic element and the optical connector and affixed to the photonic element and the framing component, wherein the optical adapter comprises at least one alignment feature and adapter optical features, wherein the alignment feature provides an alignment between the optical adapter and alignment features of the optical connector, wherein the optical connector is optically connected to the optical feature in the photonic element via the adapter optical features.

13. The optical connection assembly of claim 12, wherein the photonic element comprises at least one alignment feature, wherein the alignment feature provides an alignment between the photonic element and alignment features of the optical connector; and
wherein the optical connector is directly optically connected to the optical feature in the photonic element.

14. The optical connection assembly of claim 12, wherein the fastener comprises a clamp piece, wherein the clamp piece comprises an attachment portion, wherein the attachment portion is joined to the optical connector at the external contact point.

15. The optical connection assembly of claim 12, wherein the fastener comprises two clamp pieces, wherein each of the two clamp pieces comprise an attachment portion, wherein the attachment portion of each of the two clamp pieces is joined to the optical connector at the external contact point.

16. The optical connection assembly of claim 12, wherein the fastener comprises spring sections, wherein the spring sections provide a retaining force to secure the optical connector to the framing component.

17. The optical connection assembly of claim 12, wherein the mechanical connection feature in the framing component comprise a first hole and a second hole, wherein the fastener comprises a first insertion section and a second insertion section, and wherein the first insertion section is inserted in the first hole and the second insertion section is inserted in the second hole.

18. The optical connection assembly of claim 17, wherein the optical connection assembly further comprises a joining material disposed on the first insertion section, the first hole, the second insertion section, and the second hole to secure the fastener to the framing component.

* * * * *

UNITED STATES PATENT AND TRADEMARK OFFICE
CERTIFICATE OF CORRECTION

PATENT NO. : 11,215,775 B2  
APPLICATION NO. : 16/544699  
DATED : January 4, 2022  
INVENTOR(S) : Ashley J. Maker et al.

It is certified that error appears in the above-identified patent and that said Letters Patent is hereby corrected as shown below:

On the Title Page

Item (74), in Column 2, in "Attorney, Agent, or Firm", Line 1, delete "Shendan," and insert -- Sheridan, --.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*